(12) United States Patent
Huynh et al.

(10) Patent No.: US 11,183,946 B2
(45) Date of Patent: Nov. 23, 2021

(54) INTEGRATED RECTIFIER-GENERATOR SYSTEM FOR AC-TO-DC CONVERSION

(71) Applicant: The Board of Trustees of the University of Illinois, Urbana, IL (US)

(72) Inventors: Phuc Thanh Huynh, Urbana, IL (US); Arijit Banerjee, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/817,322

(22) Filed: Mar. 12, 2020

(65) Prior Publication Data
US 2020/0295671 A1 Sep. 17, 2020

Related U.S. Application Data

(60) Provisional application No. 62/818,797, filed on Mar. 15, 2019.

(51) Int. Cl.
| | |
|---|---|
| *H02M 7/219* | (2006.01) |
| *H02J 3/38* | (2006.01) |
| *H02M 1/14* | (2006.01) |
| *H02M 7/06* | (2006.01) |

(52) U.S. Cl.
CPC ............ *H02M 7/219* (2013.01); *H02J 3/381* (2013.01); *H02M 1/143* (2013.01); *H02M 7/06* (2013.01); *H02J 2300/28* (2020.01)

(58) Field of Classification Search
CPC ........ H02M 7/219; H02M 1/143; H02M 7/06; H02M 1/14; H02J 3/381; H02J 2300/28; H02J 3/38
See application file for complete search history.

(56) References Cited

U.S. PATENT DOCUMENTS

| | | | |
|---|---|---|---|
| 2015/0061607 A1* | 3/2015 | Pan | H02K 3/28 322/27 |
| 2018/0262137 A1* | 9/2018 | Rozman | H02P 9/48 |

OTHER PUBLICATIONS

Akagi, "Classification, Terminology, And Application Of The Modular Multilevel Cascade Converter (Mmcc)," *Ieee Transactions On Power Electronics*, vol. 26, No. 11, (2011) pp. 3119-3130.

Casanellas et al., "Losses In PWM Inverters Using IGBTS," *IEE Proceedings—Electric Power Applications*, vol. 142, No. 4, (1995) pp. 1-6.

(Continued)

*Primary Examiner* — Robert L Deberadinis
(74) *Attorney, Agent, or Firm* — Crowell & Moring LLP

(57) ABSTRACT

This disclosure relates AC-to-DC rectification and power flow control of electrical power generators. An integrated rectifier-generator AC-DC conversion circuit and system are disclosed for providing a regulated DC output. The integrated rectifier-generator AC-DC conversion circuit and system may include serially stacked passive and active rectifiers connected to multiple AC ports of an electrical power generator driven by mechanical energy captured by an energy harvester. The integrated rectifier-generator AC-DC conversion circuit and system may be configured to perform active ripple control and a maximum power tracking from the energy harvester by controlling a fraction of an overall power that flow through the active rectifier.

18 Claims, 9 Drawing Sheets

(56) References Cited

OTHER PUBLICATIONS

Che et al., "A Six-Phase Wind Energy Induction Generator System With Series-Connected DC-Links," *3rd IEEE International Symposium On Power Electronics For Distributed Generation Systems* (PEDG), (2012) pp. 26-33.

Chinchilla et al., "Control Of Permanent Magnet Generators Applied To Variable-Speed Wind-Energy Systems Connected To The Grid," *IEEE Transactions On Energy Conversion*, vol. 21, No. 1, (2006) pp. 130-135.

Duran et al., "Six-Phase PMSG Wind Energy Conversion System Based On Medium-Voltage Multilevel Converter," *In Proceedings of the 2011 14th European Conference On Power Electronics and Applications*, (2011) pp. 1-10.

Gemmell et al., "Prospects Of Multilevel VSC Technologies For Power Transmission," In *IEEE/PES Transmission and Distribution Conference and Exposition*, (2008) pp. 1-16.

Huynh et al., "An Integrated Permanent-Magnet-Synchronous-Generator-Rectifier Architecture For Limited-Speed-Range Applications," *IEEE Transactions On Power Electronics*, vol. 35, No. 5, (2020) pp. 4767-4779.

Huynh et al., "An Integrated Permanent-Magnet-Synchronous-Generator-Rectifier Architecture for Limited-Speed-Range Applications," *IEEE Transactions On Power Electronics*, vol. 35, No. 5, (2018) pp. 3413-3420.

Kuseian, "Naval Power Systems Technology Development Road Map PMS 320," *Electric Ships Office, Tech. Rep.*, (2013) pp. 1-95.

Meyer et al., "Control And Design Of Dc Grids For Offshore Wind Farms, " *IEEE Transactions On Industry Applications*, vol. 43, No. 6, (2007) pp. 1475-1482.

Meynard et al., "Multi-Level Choppers For High Voltage Applications," *EPE Journal*, vol. 2, No. 1, (1992) pp. 45-50 [Online]. Available: https://Doi.Org/10.1080/09398368.1992.

Mura et al., "Analysis Of A Gearless Medium-Voltage Variable Speed Gas Turbine," *VGB Power Tech* (2011) pp. 39-43.

Ottensen, "Global Offshore Wind Market Report," *Norweigian Energy Partner, Tech. Rep.*, (2018) pp. 1-36.

Pena et al., "Doubly Fed Induction Generator Using Back-To-Back PWM Converters And Its Application To Variable-Speed Wind-Energy Generation," *IEE Proceedings—Electric Power Applications*, vol. 143, No. 3, (1996) pp. 231-241.

Polinder et al., "Comparison Of Direct-Drive And Geared Generator Concepts For Wind Turbines," *IEEE Transactions On Energy Conversion*, vol. 21, No. 3, (2006) pp. 725-733.

Prasad et al., "An Active Power Factor Correction Technique For Three-Phase Diode Rectifiers," *IEEE Transactions On Power Electronics*, vol. 6, No. 1, (1991) pp. 83-92.

Rodriguez et al., "Multilevel Voltage-Source-Converter Topologies For Industrial Medium-Voltage Drives," *IEEE Transactions On Industrial Electronics*, vol. 54, No. 6, (2007) pp. 2930-2945.

Sulligoi et al., "Shipboard Power Generation: Design And Development Of A Medium-Voltage Dc Generation System," *IEEE Industry Applications Magazine*, vol. 19, No. 4, (2013) pp. 47-55.

Vujacic et al., "Analysis Of Dc-Link Voltage Switching Ripple In Three-Phase PWM Inverters," *Energies*, vol. 11, No. 2, (2018) pp. 1-14.

Yaramasu et al., "High Power Wind Energy Conversion Systems: State-Of-The-Art And Emerging Technologies," *Proceedings Of The IEEE*, vol. 103, No. 5, (2015) pp. 740-788.

Yazdani et al., "A Neutral-Point Clamped Converter System For Direct-Drive Variable-Speed Wind Power Unit," *IEEE Transactions On Energy Conversion*, vol. 21, No. 2, (2006) pp. 596-607.

Cho et al., "Detailed Electromagnetic Analysis of a High Specific Power Slotless Permanent Magnet Motor with Imbalanced Armature Windings," *IEEE* (2017) pp. 1-4.

Kazmi et al., "A Novel Algorithm for Fast and Efficient Speed-Sensorless Maximum Power Point Tracking in Wind Energy Conversion Systems," *IEEE Transactions On Industrial Electronics*, vol. 58, No. 1, (2011) pp. 29-36.

Tan et al., "Optimum Control Strategies in Energy Conversion of PMSG Wind Turbine System Without Mechanical Sensors," *IEEE Transactions On Energy Conversion*, vol. 19, No. 2, (2004) pp. 392-399.

\* cited by examiner

Generator thee-phase winding set

Passive rectifier

Active rectifier

INTEGRATED RECTIFIER-GENERATOR SYSTEM FOR AC-TO-DC CONVERSION

CROSS REFERENCE

This patent application claims benefit to U.S. Provisional Patent Application No. 62/818,797 filed Mar. 15, 2019 and titled "An Integrated Rectifier-Generator System for AC-to-DC Conversion," which is herein incorporated by reference in its entirety.

FEDERALLY SPONSORED RESEARCH OR DEVELOPMENT

This invention was made with government support under Award DE-AR0001057 from the U.S. Department of Energy under the Advanced Research Projects Agency-Energy (ARPA-E) program. The government has certain rights in the invention.

TECHNICAL FIELD

This application relates to AC-to-DC rectification and power flow control of electrical power generators.

BACKGROUND

High efficiency and high power density are critical in megawatt-class mechanical-to-electrical energy conversion systems that operate within a limited speed range. AC electrical output generated from such energy conversion systems may be connected to AC-to-DC converters for processing, regulating, and controlling electric power flow for distribution to an existing electric grid or for forming an electric grid. Conventional fully controlled AC-to-DC electrical converters relying on power-electronic switches are bulky, inefficient, and unreliable.

SUMMARY

This disclosure relates to AC-to-DC rectification and power flow control of electric power generators. An integrated rectifier-generator AC-DC conversion circuit and system are disclosed for providing a regulated DC output. The integrated rectifier-generator AC-DC conversion circuit and system may include serially stacked passive and active rectifiers connected to multiple AC ports of an electrical power generator driven by mechanical energy captured by an energy harvester. The integrated rectifier-generator AC-DC conversion circuit and system may be configured to perform active ripple control and a maximum power tracking from the energy harvester by controlling a fraction of an overall power that flow through the active rectifier.

DETAILED DESCRIPTION

Figure 1:
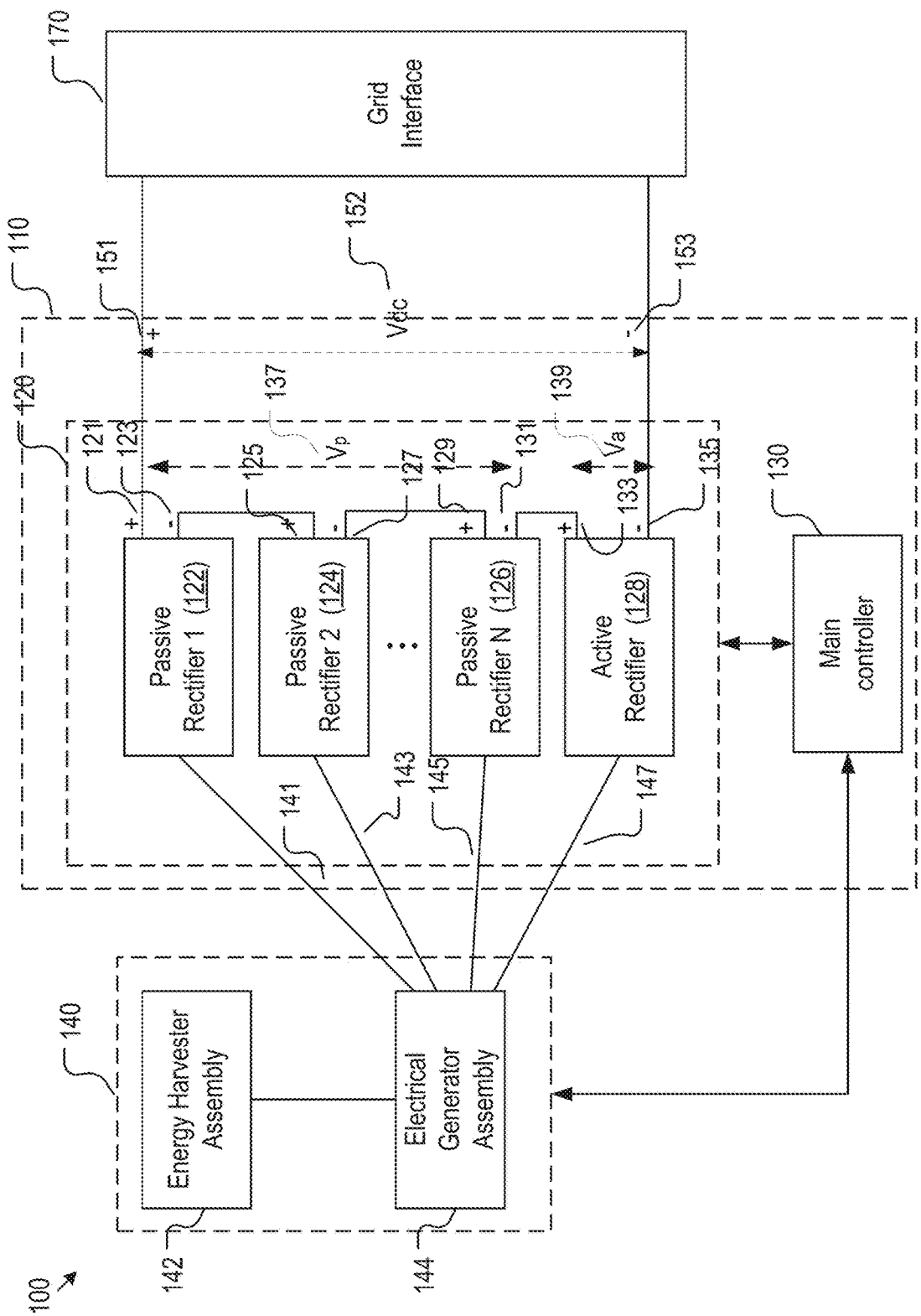
FIG. 1 illustrates an example integrated rectifier-generator AC-DC conversion system.

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

By way of introduction, mechanical power from various energy sources may be harvested to power a turbine. Such a turbine may then be adapted to drive an electrical power generator to create electricity. The electrical power generator may produce AC (alternating current) electrical output for forming a DC (direct current) power grid or for distribution to a fixed-frequency AC power grid. In either of these applications and for various reasons, it may be desirable to first convert the AC electrical output from the electrical power generator to DC output and connect such a DC output to a regulated DC bus. For example, instantaneous power flow from some mechanical power sources, such as wind, may fluctuate uncontrollably in time, leading to a significant variation in turbine speed and in corresponding amplitude and frequency of the AC output from the electrical power generator coupled to the turbine. In such situations, a regulated DC bus may serve as an intermediary between the electrical power generator and the fixed-frequency AC grid. For another example, the electric power generator may be used to directly form a medium voltage DC (MVDC) grid. In such situations, the output of the electrical power generator may also need to be converted and regulated to a DC voltage of the MVDC grid.

While an AC-to-DC conversion in a megawatt power range may be achieved using fully controlled high-power electronic switches, such conventional conversion systems are bulky, inefficient, and unreliable. The disclosure below provides various implementations that integrate an AC power generation system with series-stacked passive rectifiers and active rectifiers for providing regulated DC output. Because only a fraction of the overall electric power flow is processed through and controlled by the active rectifiers, such implementations allow for improved power conversion efficiency, increased overall power density using electronic power switches of lower power ratings, and higher operation reliability of the conversion system. The windings and poles of the AC electrical power generators and the power flow via the passive rectifiers may be adapted to reduce output DC ripples. The portion of the power flow through the active rectifiers may be further controlled to actively compensate for residual DC ripples from the passive rectifiers, thereby further reducing an overall output DC ripple. Furthermore, the active rectifiers may be adapted to control the overall power flow to track an optimal mechanical energy conversion by the turbines for variable-speed generator systems, thereby enabling maximum extraction of mechanical power for distribution to an existing power grid. While the example implementations described below are based on specific mechanical power sources and energy harvesting turbines, the underlying principles are applicable to other types of turbines driven by various other types of mechanical energy sources.

FIG. 1 illustrates a block diagram showing an example integrated rectifier-generator AC-DC conversion system 100 according to an example implementation of this disclosure. FIG. 1 shows that the example integrated rectifier-generator AC-DC conversion system 100 may include a power conversion subsystem 140 and a rectifier subsystem 110. The power conversion subsystem 140 may generate AC electrical output from various power sources. The rectifier subsystem 110 may convert the AC output of the power conversion subsystem 140 into a DC output and connect the DC output to a DC grid interface 170 via a positive DC terminal 151 and a negative DC terminal 153. The grid interface may be directly used to form a DC grid such as an MVDC grid or connected to an intermediate DC bus that is further connected to a fixed-frequency AC power grid.

The power conversion subsystem 140 may include two main components: an energy harvester assembly 142 and an electrical power generator assembly 144. The energy harvester assembly may include one or more energy harvesters for capturing energy from energy sources of various types. The types of energy sources may include, but are not limited to, wind, tide, hydro, fossil, and thermal energy sources. Correspondingly, each of the one or more energy harvesters may be configured to capture energy from any type of these energy sources and mechanically transfer the captured energy to the electrical power generator assembly 144. The one or more energy harvesters, for example, may be implemented as any combination of wind turbines, water turbines, steam engines, gas engines, and the like. The electrical generator assembly 144 may include one or more electrical power generators and may be configured to collectively generate at least two electrical outputs as shown by 141, 143, 145, and 147 in FIG. 1. Each of these outputs from the one or more electrical power generators may be an AC output. Each AC output may vary in frequency and amplitude. Each AC output may include a single phase or multiple phases of predetermined phase relationship. Each of the AC outputs 141, 143, 145, and 147 may be alternatively referred to as an AC port. Each multiphase AC port may correspondingly be provided as multiple electrical connections.

While the power conversion subsystem 140 of FIG. 1 may generally include any combination of different types of energy harvesters 142 and one or more electrical generators 144, it is assumed merely as examples in the implementations below that the power conversion subsystem 140 includes a single electrical generator 144 powered by a single turbine 142 as the energy harvester, that the single electrical generator 144 is configured with at least two AC output ports 141, 143, 145, and 147, and that each of the AC output ports contains three phases that are separated by 120 degrees. As examples, the single electrical generator 144 may be implemented as a doubly-fed induction generator or a permanent-magnet synchronous generator (PMSG), or the like.

Continuing with FIG. 1, the example integrated rectifier-generator AC-DC conversion system 100 may include the rectifier subsystem 110 for converting the AC outputs 141, 143, 145, and 147 from the electrical generator assembly 144 to DC output at the terminals 151 and 153. The rectifier subsystem 110 may include a rectifier circuit 120 and a main controller 130. The rectifier circuit may include a combination of M active rectifiers and N passive rectifiers, where M and N are positive integers. Merely as an example, FIG. 1 shows that the rectifier circuit 120 may include N passive rectifiers 122, 124, and 126 and one active rectifier 128. Each of the rectifiers 122, 124, 126, and 128 corresponds to and is connected to one of the AC output ports 141, 143, 145, and 147 of the electrical generator assembly 144. Each of the N passive rectifiers may provide a pair of terminals for DC output, as shown by (121, 123), (125, 127), and (129, 131). The DC output terminals of the N passive rectifiers may be stacked serially to provide a passive DC output 137 (between terminal 121 and 131), denoted as $V_p$. Likewise, each of the M active rectifiers may provide a pair of terminals for DC output, shown as (133, 135) for the example single active rectifier 128. The DC output terminals of M active rectifiers may be stacked serially to provide an active DC output 139, denoted as $V_a$. The passive DC output 137 of the N passive rectifiers and the active DC output 139 of the M active rectifiers may be further stacked serially to provide a combined DC output 152 denoted as $V_{dc}$ between the positive terminal 151 and the negative terminal 153 of the rectifier circuit 120. The serial stacking of the DC outputs of the passive rectifiers and active rectifiers to form the combined DC output are not limited to the particular order illustrated in FIG. 1. The outputs of rectifers 122, 124, 126, and 128 may be serially stacked in any order.

The main controller 130 of the rectifier subsystem 110 may be configured to control the operation of one or more of the M active rectifiers, such as the active rectifier 128 in FIG. 1, to achieve the regulation, ripple reduction, and maximum power tracking functions described above and explained in more detail below. The main controller 130 may be implemented as any type of electronic circuitry. The main controller 130, for example, may include one or more processors, microcontrollers, programmable logic devices, application specific integrated circuits, analogy circuits, and any combinations thereof. The main controller 130 may be wholly or partially implemented as a single integrated circuit on a single semiconductor substrate, a system on chip, or the like. In some example implementations as shown in FIG. 1, the main controller 130 may be connected to the rectifier circuit 120 and the power conversion subsystem 140. Such a connection may be a direct connection, or indirect connection via other intermediate components and/or interfaces. The main controller 130 may be configured to perform the regulation, ripple reduction, and maximum power tracking functions either separately or in a combination. The main controller 130 may monitor and acquire various parameters from the rest of the integrated rectifier-generator system 100 and other sensors, I/O interface, internal/external network or switches, or the like. The main controller 130 may process these parameters in real time and provide control signals to one or more of the M active rectifiers to achieve the regulation, ripple reduction, and maximum power tracking functions.

For example, the main controller 130 may be configured to perform active ripple reduction on the combined DC output $V_{dc}$ 152 by controlling the active DC output voltage $V_a$ 139. As described in more detail below, the main controller 130 may actively monitor the voltage of the passive DC output $V_p$ 137 to derive a passive DC output ripple of the passive DC output $V_p$ 137, and then generate and provide control signals to the active rectifier 128 to regulate the active rectifier DC output $V_a$ 139 such that the active rectifier DC output $V_a$ 139 contains an active DC output ripple component that compensates or negates the passive DC output ripple in real time, thereby reducing the overall DC ripple of the combined DC output $V_{dc}$ 152. In such implementations, no additional assisted ripple reduction mechanisms for the passive rectifiers are needed as a result of the active ripple compensation by the active rectifier. Bulky power capacitors that are typically required for these ripple reduction mechanisms are therefore avoided.

For another example, the main controller 130 may be configured to perform maximum power point tracking of an energy source with power flow variation, such as a wind turbine. As described in more detail below, the main controller 130 may be configured to monitor a rotation speed of the wind turbine and/or the electrical generator, and an output power of the system 100 to derive control signals to control a power flow through one or more of the M active rectifies, causing the wind turbine and/or the generator to rotate at an optimal speed for maximum mechanical power extraction from the wind.

In these example implementations having series-stack rectifier configuration, the electrical power flows through both the passive rectifiers and the active rectifiers. Control of the power flow through the active rectifier leads to control of power flow of the entire system. By only controlling the fraction of power flow through the rectifier circuit 120, requirements on power switches used in the active rectifiers (as described in more detail below in relation to FIG. 3) may be significantly lowered in that they not need to have a high power rating.

In some applications, the example integrated rectifier-generator AC-DC conversion system 100 of FIG. 1 may be connected to a fixed-frequency AC grid for power distribution. In such applications, the grid interface 170 may function as an intermediary DC bus between the system 100 and the fixed-frequency AC grid. The grid interface 170 may be implemented as a stiff DC bus with fixed DC voltage. In these applications, it may be preferable for the integrated rectifier-generator AC-DC conversion system 100 to extract maximum possible mechanical power from the energy source by, for example, a wind turbine. The main controller 130 may be configured to control the power flow in the active rectifier for maximum power extraction. Example implementations are illustrated in FIGS. 3-4 with detailed description below.

In some other applications, the example integrated rectifier-generator AC-DC conversion system 100 may be used to form a DC grid, such as a MVDC grid. For example, such a MVDC grid may be implemented in a ship or an airplane. The integrated rectifier-generator AC-DC conversion system 100 may be powered by gas engines. In such applications, it may be desirable to maintain stable DC voltage for the MVDC grid. As such, the main controller 130 may be configured to perform active ripple compensation as described above and in more detail below in relation to FIGS. 6-8.

Figure 9:
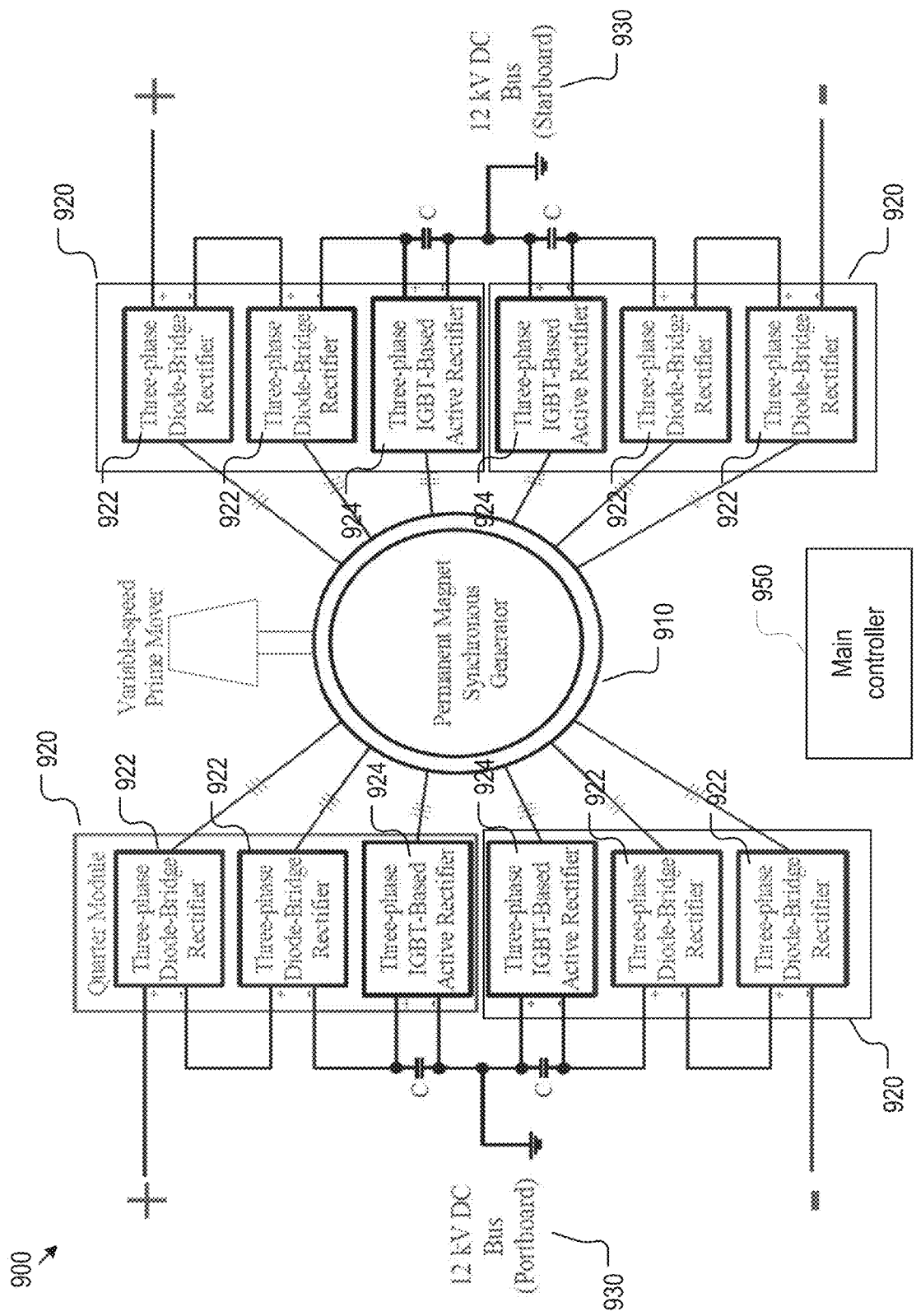
FIG. 9 illustrates example power-electronic building blocks (PEBBs).

An example MVDC grid formation based on the integrated rectifier-generator AC-DC conversion system 100 is illustrated in FIG. 9. Specifically, FIG. 9 shows an example integrated rectifier-generator AC-DC conversion system 900 in which passive rectifiers and active rectifiers are serially-stacked to function as Power-Electronic Building Blocks (PEBBs). In this implementation, a variable-speed gas-turbine-driven permanent magnet synchronous generator (PMSG) 910 creates, for example, twelve three-phase AC ports. Each AC port is connected either to a three-phase diode-based passive rectifier 922 as PEBB1, or a three-phase IGBT-based active rectifier 924 as PEBB2. Serially stacking DC outputs of two PEBB1s with a DC output of one PEBB2, for example, creates one quarter module 920, which may be rated to generate, for example, a 6 kV dc bus. Serially stacking two of these quarter modules produces one 12 kV port MVDC bus 930 with the midpoint as the ground reference. With no capacitors across the output of PEBB1s for assisting ripple reduction, the passive rectifier ripple voltage generated by these modules may be actively cancelled by controlling the PEBB2s using the main controller 950. Additionally, when the gas turbine speed decreases from the maximum/rated speed, to ensure better gas-turbine efficiency at lighter load, the output voltage drops in the PEBB1s can be compensated by controlling the PEBB2 using the main controller 950.

Figure 2A:
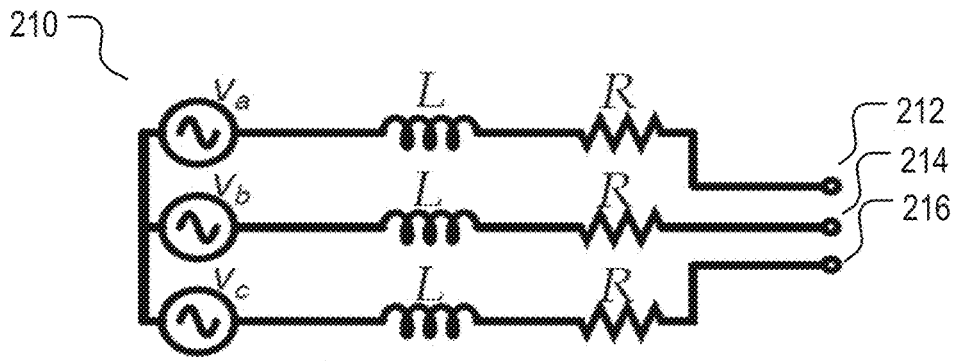
FIG. 2a illustrates an equivalent circuit of an example three-phase winding set of an AC electrical generator.

FIG. 2a illustrates an example three-phase winding set 210 used in the electrical generator 144 of the integrated rectifier-generator system 100 of FIG. 1. The three-phase winding set 210 may provide one of the AC output ports 141, 143, 145, and 147 of FIG. 1. FIG. 2a shows that the three AC phases may be output via terminals 212, 214, and 216. Each phase may be modeled by a back emf source in series with a synchronous inductance L and phase resistance R. An electrical generator may effectively include a plurality of the three-phase winding sets, each corresponding to one of its multiple AC output ports.

Figure 2B:
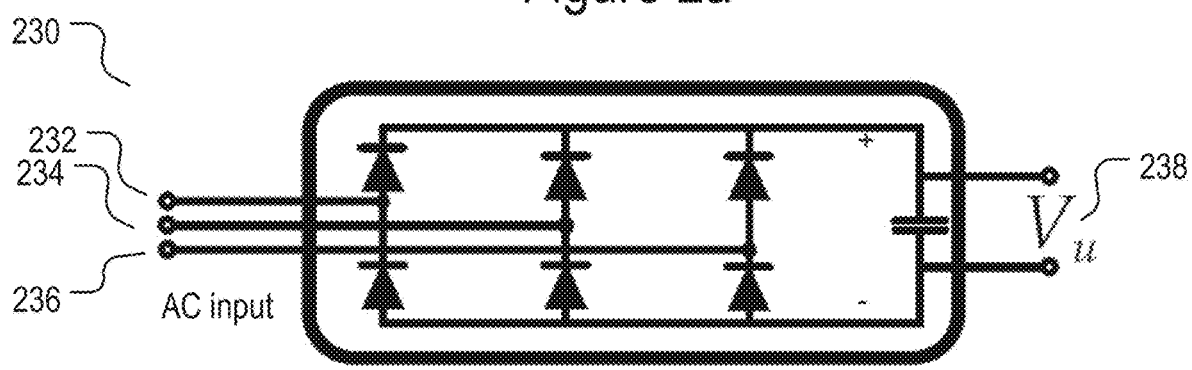
FIG. 2b illustrates a circuitry of an example three-phase six-diode-bridge passive rectifier.

FIG. 2b illustrates an example passive rectifier 230 based on multi-diode bridges. Such a passive rectifier may be used in the rectifier circuit 120 of FIG. 1 and connected to one of the AC output ports 141, 143, 145, and 147 of FIG. 1. The example passive rectifier 230 is illustrated as a three-phase passive rectifier with AC input nodes 232, 234, and 236 that may be connected to the AC output terminals 212, 214, and 216 of one of the three-phase winding sets of the electrical generator. The example passive rectifier 230 may convert the three-phase AC input to provide a DC output 238.

Figure 2C:
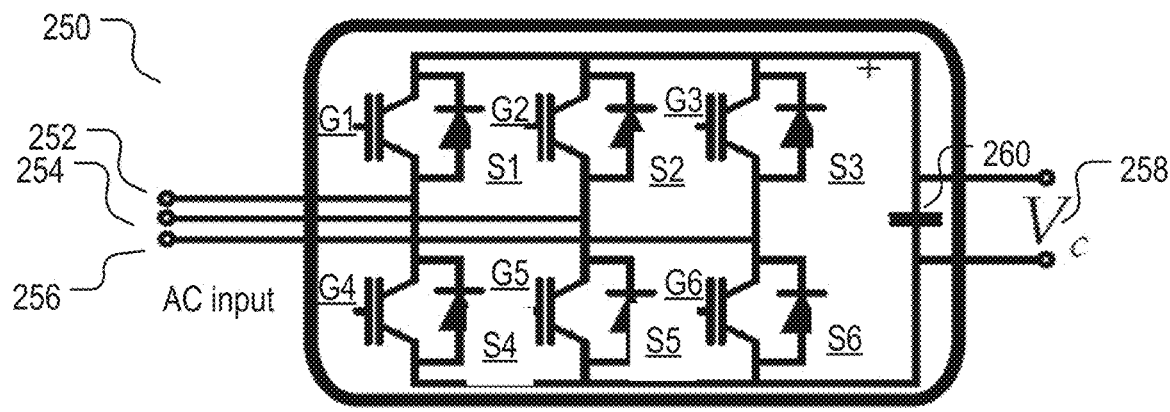
FIG. 2c illustrates a circuitry of an example controllable three-phase switching active rectifier.

FIG. 2c illustrates an example active rectifier 250 based on controllable power switches. Such an example active rectifier may be used in the rectifier circuit 120 of FIG. 1 and connected to one of the electrical generator AC output ports 141, 143, 145, and 147. The example active rectifier 250 is illustrated as a three-phase active rectifier with AC input node 252, 254, and 256 that may be connected to the AC output terminals 212, 214, and 216 of one of the three-phase winding sets of the electrical generator in FIG. 2a. The example active rectifier 250 of FIG. 2c contains a plurality of electrical power switches S1-S6, with each input AC phase corresponding to a pair of the electrical power switches. The electrical power switches S1-S6 can be implemented as any suitable type of switching devices, such as IGBT, SGCT, GTO, BJT, thyristor, or MOSFET. These electrical power switches may be turned on or off by controlling electric bias at the gates G1-G6. The example active rectifier 250 may further include a power capacitor 260 at the DC output 258 (alternatively, the power capacitor 260 may be provided as an external electronic component to the active rectifier 250). The DC output (either DC voltage, DC current, or DC power) of the example active rectifier 250 may be regulated by controlling the electrical switches S1-S6 via the control gates G1-G6 according to any suitable form of switching schemes. For example, in combination with the synchronous inductance L of the AC generator winding set 210 of FIG. 2a (when connected with the active rectifier 250) and the power capacitor 260, the DC output may be regulated by a pulse width modulation (PWM) of switching signals applied to gates G1-G6 under the principle governing different types of switching power supply. The switching signals may be generated by the main controller 130 of FIG. 1. The electrical switches S1-S6 of the active rectifier open or close in accordance with the switching signals applied to gates G1-G6. By controlling a time ratio (or duty cycle) between on and of states of the power switches by adjusting "on" pulse width in the switching signals under a predetermined switching frequency, the active rectifier is capable of regulating the AC input power to control the characteristics of the DC output 258, including DC voltage, current, and power at the DC output 258. The switching frequency for the active rectifiers, for example, may be between 5 KHz and several MHz.

An example for configuring the main controller 130 of FIG. 1 to control the active rectifier 128 of FIG. 1 (e.g., active rectifier of 250 in FIG. 2) for achieving maximum power conversion by the energy harvester 142 of FIG. 1 is illustrated in FIGS. 3-4 in the context of electricity generation from wind power and the like. In general, for certain types of energy harvesting such as wind power, where a flow of air having a particular density and speed is captured for driving a turbine, there may be an optimal rotational speed for the wind turbine to achieve a maximum mechanical energy conversion from the air flow by the turbine. Such an optimal turbine rotational speed may be determined through underlying aerodynamics for each particular wind speed/density and a particular set of mechanical characteristics of the wind turbine. As a result, there may correspondingly be an optimal rotational speed for the electrical power generator mechanically coupled to the wind turbine for a particular wind speed and air density. When the rotational speed of the wind turbine and the electrical generator move from the optimal speed condition (either faster or slower), the efficiency of conversion from the in-flow wind power to mechanical energy that drives the electrical generator decreases. As described in further detail below, in some applications, the main controller 130 may be configured to control the electrical power flow through the one or more active rectifiers to track and maintain a maximum mechanical power conversion as the wind speed changes in time.

Figure 3A:
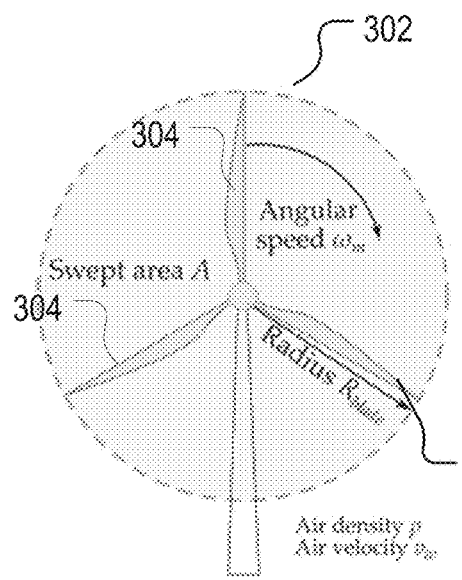
FIG. 3a illustrates an example wind turbine.
Figure 3B:
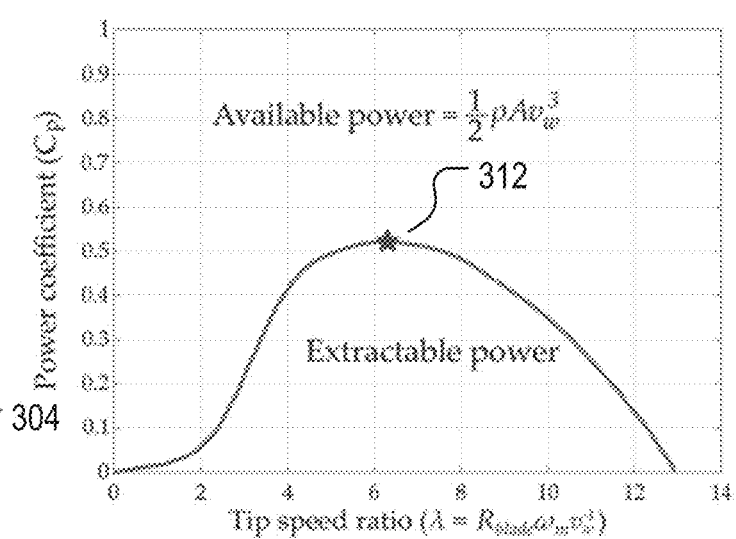
FIG. 3b illustrates an example power coefficient curve for the wind turbine of FIG. 3a as a function of a ratio between a blade tip speed and wind speed.
Figure 4:
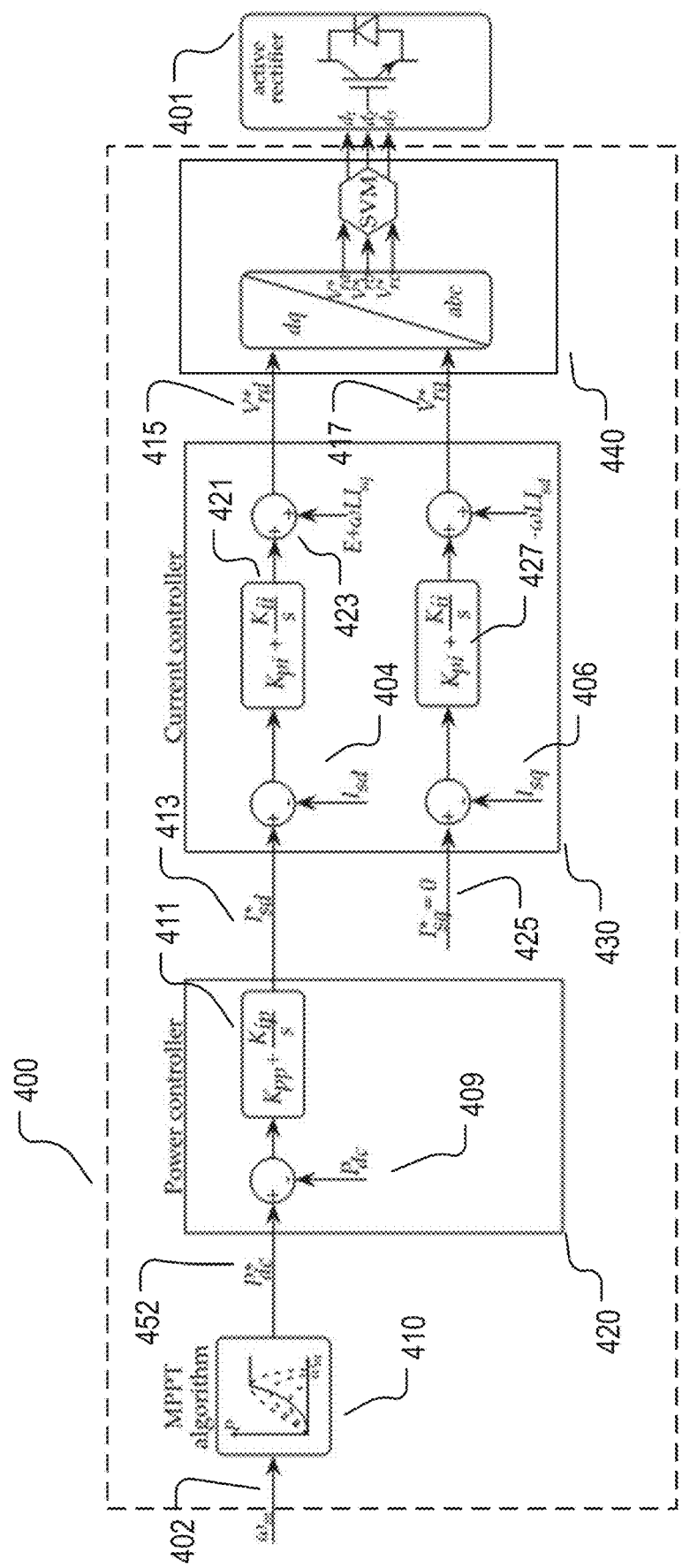
FIG. 4 illustrates an example logic for controlling a power flow in active rectifiers in the example integrated rectifier-generator AC-DC conversion system of FIG. 1 for maximum mechanical power extraction.

For example, FIG. 3a illustrates a wind turbine 302 with three blades 304 with each blade having a tip radius $R_{blade}$ and swept area A. The rotational speed of the wind turbine is denoted by $\omega_m$ whereas the air density and air speed are denoted by $\rho$ and $v_w$, respectively. FIG. 3b plots the power conversion coefficient ($C_p$) as a function of a ratio of the tip speed of the blades 304 to the air speed $v_w$. FIG. 3b shows that the energy conversion coefficient is at a maximum when the wind turbine rotates at a speed corresponding to the optimal operating point shown by 312.

Figure 3C:
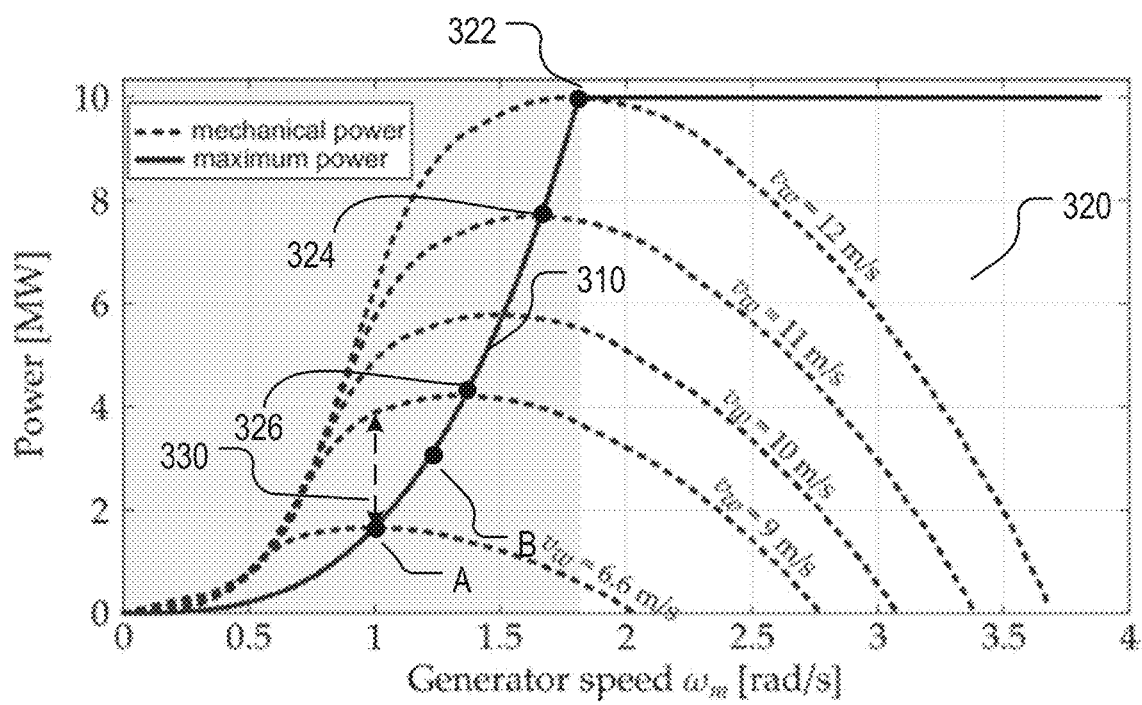
FIG. 3c illustrates mechanical power harvesting curves of the wind turbine of FIG. 3a as a function of an electrical generator rotation speed for various wind speeds and a maximum power curve as a function of the electrical generator rotation speed.

FIG. 3c further shows dotted curves 320 representing mechanical power converted by the wind turbine as a function of rotational speed of the electrical generator (corresponding to the rotational speed of the blades 304 of FIG. 3a, and for convenience, both rotational speeds may be denoted by $\omega_m$) for various wind speed. The optimal operation points for each of the wind speeds form the solid maximum power or optimal operation curve 310. Merely as an example, it is assumed in FIG. 3c that the wind turbine has a blade radius of $R_{blade}$=90 m, and operates at or below a rated wind speed of 12 m/s (the rated wind speed represents a maximum wind speed for safe turbine operation as determined by the mechanical characteristics of the turbine). The air density $\rho$ is assumed to be 1.15 kg/m3. In more detail, FIG. 3c plots dotted curves 320 for the converted mechanical power from the wind by the wind turbine at various wind speeds as a function of the rotational speed of the electrical generator. Points 322, 324 and 326, for example, represent peak converted mechanical power points corresponding to wind speeds of 12 m/s, 11 m/s and 9 m/s, respectively. The maximum power or optimal operation curve 310 is formed by connecting peak power points of all the mechanical power curves 320. Above the rated wind speed for the turbine (12 m/s in this particular example), the maximum power curve is clamped at the maximum power for the rated wind speed, as shown by the flat portion of the maximum power curve 310 in FIG. 3.

At each particular wind speed, the generator may settle or stabilize at a rotational speed on the corresponding dotted curve 320 with an electrical power output balancing the electrical load. In applications where the electrical output is distributed into a stiff DC grid (or DC bus with a fixed DC voltage) and the electric load is thus adaptable, the goal of the maximum power tracking function may include configuring the main controller 130 for maximum power extraction into the grid by regulating the electrical power flow through the active rectifier such that the rotational speed of the electrical generator tracks the optimal operation points on the maximum power curve 310 as the wind speed varies in time. Specifically, for each wind speed, a vertical line crossing the corresponding maximum power point splits the corresponding power curve 320 into two regions (left and right) of the generator rotational speed. In the left region, the wind turbine and the electric generator rotate at a slower than optimal speed and the maximum harvestable mechanical power from the wind is higher than that is actually harvested into electric power. The generator rotational speed thus increases while the main controller 130 controls the one or more active rectifiers to increase electric power output. In the right region, actually harvested mechanical power is lower than the maximum harvestable wind power and the rotational speed of the electrical generator is not sufficiently supported by the actually harvested mechanical power. The generator thus slows down while the main controller 130 controls the one or more active rectifiers to decrease the electric power output. An example of the two regions are illustrated for a wind speed of 12 m/s as the shaded region (left, speed up region) and unshaded region (right, slow down region) in FIG. 3c. The goal of the maximum power tracking function of the main controller 130 is to control the power flow through the one or more active rectifiers such that the rotational speed of the electrical generator settles at the maximum power point at each particular wind speed and tracks the maximum power curve 310 as the wind speed changes.

FIG. 4 illustrates an example logic flow 400 of the main controller 130 for accomplishing the maximum power point tracking (MPPT) described above. For the implementation of the logic flow 400, it is assumed that the output of the rectifier circuit 120 of FIG. 1 is connected to a stiff DC bus with constant DC voltage. In the logic flow 400, the main controller 130 monitors the rotational speed of the electrical generator $\omega_m$ as shown by 402, an actual DC power at the combined DC rectifier interface as shown by 409, and the AC side d-axis current ($I_{sd}$) and q-axis current ($I_{sq}$) of the active rectifier respectively shown by 404 and 406 to generate switching signals to control the active rectifier 401 for accomplishing the MPPT function. The AC side d-axis current ($I_{sd}$) and q-axis current ($I_{sq}$) for the active rectifier may be determined based on a d-q frame model.

More specifically, based on the actual output electrical power and generator speed dynamics, the main controller 130 configured with the example logic flow 400 of FIG. 4 controls the active rectifier to achieve a combined DC power that matches a target DC power determined using a monitored current electrical generator rotation speed according to the maximum power curve 310 of FIG. 3c. As can be shown, there exists a relationship between the combined DC output power and the active rectifier d-axis current. In particular, by controlling the power flow through the active rectifier, the active rectifier d-axis current can control the power flowing into the combined DC bus (which is equivalent to the mechanical power flow into the wind turbine, neglecting mechanical to electrical power conversion loss at the electrical generator) when the combined DC output voltage is fixed at the stiff DC grid and the AC side q-axis current of the active rectifier is set to zero. The d-axis current on the AC side of the active rectifier thus correlates with the mechanical power converted by the turbine. This can be demonstrated by the following relation:

$$\frac{3}{2}E(\omega)I_{sd} - \frac{3}{2}I_{sd}^2 R = P_{dc}^2\left((k-1)\frac{1}{V_{dc}^2}\left(\frac{3}{\pi}\omega L + 2R\right)\right) + P_{dc}\left(1 - \frac{3}{\pi}(k-1)\frac{\sqrt{3}E(\omega)}{V_{dc}}\right).$$

where k is the total number of passive rectifiers and active rectifiers and k is greater than 1; (k−1) is the total number of passive rectifiers; $E(\omega)$ is the back emf of the electrical generator, $\omega$ is the generator rotation speed or equivalent; L and R are the synchronous inductance and per-phase equivalent series resistance of each of the AC ports of the electrical generator, respectively; $V_{dc}$ and $P_{dc}$ are the voltage and power of the combined DC output, respectively; and $I_{sd}$ is the active rectifier d-axis current on the AC side.

In this particular example of FIG. 4, a single three-phase active rectifier 401 is used (for simplicity, only one switch is illustrated in FIG. 4). As such, the control signals generated by the logic flow 400 include three separate switching signals, denoted in FIG. 4 as $d_1$, $d_2$, and $d_3$, for controlling the three pairs of switches corresponding the three AC phases connected to the active rectifier, as shown in FIG. 2c. The example logic flow 400 of FIG. 4 may include four cascading portions: an MPPT algorithm logic 410, a power controller logic 420, a current controller 430, and a control signal generator 440.

The MPPT algorithm logic 410 may be configured to determine a target power 452 denoted by $P^*_{dc}$ for the combined DC power output including power flow through both the passive rectifiers and the active rectifiers. In more detail, the MPPT algorithm logic 410 acquires a current generator rotation speed $\omega_m$, using, for example, a rotation sensor at the electrical generator. The MPPT algorithm logic 410 further determines the target power $P^*_{dc}$ based on the maximum power curve 310 of FIG. 3c using a lookup process according the current generator rotational speed Wm. Because the rational speeds of the electric generator and the wind turbine are correlated, in some other alternative implementations, the rational speed of the wind turbine rather than the generator may be monitored and used to determine the target power $P^*_{dc}$ 452.

The power controller logic 420 may be configured to compare the target power $P^*_{dc}$ with a feedback signal indicative of an actual DC power of the combined DC output interface (of the passive and active rectifiers), denoted by $P^*_{dc}$ 409, to generate a power error signal. The power error signal is passed to a proportional integral (PI) controller 411. The PI controller may be configured with proportional gain $K_{pp}$ and integral gain $K_{ip}$ that are pre-tuned. The output of the PI controller includes a target d-axis current on the AC side of the active rectifier, denoted by $I^*_{sd}$ and as shown by 413. The target d-axis current $I^*_{sd}$ 413 is thus given by:

$$I^*_{sd} = K_{pp}(P^*_{dc} - P_{dc}) + K_{ip}\int(P^*_{dc} - P_{dc})dt$$

The current controller 430 may be configured to generate a target d-axis voltage $V^*_{rd}$ 415 and a target q-axis voltage $V^*_{rq}$ 417 on the AC side of the active rectifier based on the target d-axis current $I^*_{sd}$ 413 using two separate control paths. The first path may be configured to compare the target d-axis current of the active rectifier $I^*_{sd}$ 413 from the power controller 410, with a feedback signal indicative of the actual d-axis current for the active rectifier $I_{sd}$ 404 to generate a d-axis current error signal. Such an error signal is passed to a proportional integral (PI) controller 421 configured with pre-tuned proportional gain $K_{pi}$ and integral gain $K_{ii}$. The output of the PI controller 421 is further compensated by a value ($E+\omega LI_{sq}$) as shown by 423 to generate the target d-axis voltage $V^*_{rd}$ 415 for the active rectifier. The target d-axis voltage $V^*_{rd}$ 415 is thus given by:

$$V^*_{rd} = K_{pi}(I^*_{sd} - I_{sd}) + \int K_{ii}(I^*_{sd} - I_{sd})dt + E + \omega LI_{sq}$$

where E, $\omega$, L, $I_{sq}$ are back emf, generator speed or its equivalent, generator AC port synchronous inductance, and q-axis current for the active rectifier, respectively. The value ($E+\omega LI_{sq}$)) directly cancels out the effect of generator back emf and q-axis current through generator inductance. This feed-forward compensation makes it easier for design and implementation of the d-axis current controller.

The second control path of the current controller 430 is configured to compare a target q-axis current $I^*_{sq}$ 425 for the active rectifier with a feedback signal indicative of the actual q-axis current for the active rectifier $I_{sq}$ 406 to generate a q-axis current error signal. Such an error signal is passed to a proportional integral (PI) controller 427 configured with pre-tuned proportional gain $K_{pi}$ and integral gain $K_{ii}$. The output of the PI controller 427 is further compensated by a value ($-\omega LI_{sd}$) as shown by 429 to generate the target q-axis voltage $V^*_{rq}$ 417 for the active rectifier. The value ($-\omega LI_{sd}$) ensures that the q-axis voltage generation is decoupled from the effect of d-axis current through generator inductance. The target q-axis voltage $V^*_{rq}$ 417 is thus given by:

$$V^*_{rq} = K_{pi}(I^*_{sq} - I_{sq}) + \int K_{ii}(I^*_{sq} - I_{sq})dt - \omega LI_{sd}$$

The control signal generator 440 is configured to transform the target d-axis voltage $V^*_{rd}$ 415 and target q-axis voltage $V^*_{rq}$ 417 from the current controller into switching signals to control the active rectifier. In this particular example, the target d-axis voltage $V^*_{rd}$ 415 and target q-axis voltage $V^*_{rq}$ 417 may be converted by a frame converter and a space vector modulator to generate the switching signal $d_1$, $d_2$, and $d_3$ for controlling the active rectifier DC output power flow.

Each of the power controller 420, current controller 430, and the active rectifier 401 may be configured to respond to changes in its input with respective characteristic time constants. For example, the response time for the power controller 420 may be slower than the current controller 430 which may be slower than the voltage output response of the active rectifier 401 to the control signal. In some implementations, the response time for the power controller 420 may be on the order of 50 milliseconds to seconds, and the response time for the current controller 430 may be on the order of 0.5 milliseconds to 50 milliseconds. The response time of the active rectifier 401 to control signals $d_1$, $d_2$, and $d_3$ may be on the order of 20 microseconds to 1 millisecond, largely depending on the switching frequency of the control signals $d_1$, $d_2$, and $d_3$. As such, any changes of the control signals $d_1$, $d_2$, and $d_3$ are tracked by the active rectifier on a fast time scale to modify its AC side d-axis and q-axis current, which is tracked by the current controller on a slower time scale. The power controller 420 tracks the mechanical rotational speed of the electrical generator and the combined DC output power on the slowest time scale.

The manner in which example logic flow 400 of the main controller 130 operates to track maximum power is illustrated by referring back to FIG. 3c. Assuming that Initially the wind speed is steady at 6.6 m/s and the electrical generator rotates at an optimal steady speed of 1 rad/s, as shown by point A in FIG. 3c (representing an intersection between the maximum power curve 310 and the power curve 320 for the wind speed of 6.6 m/s). All error signals in the power controller 420 and current controller 430 are zero at this initial time. The corresponding combined DC output power as flowed from the converted mechanical power by the wind turbine is around 1.7 MW, as shown by the power value of point A. When the wind speed increases to 9 m/s, the mechanical power increases to about 3.8 MW following the wind speed at the same initial generator rotational speed of 1 rad/s, as indicated by arrow 330. The excess mechanical power acts to accelerate the wind turbine and the electrical generator rotation speed $\omega_m$ increases. As the electrical generator speed accelerates to, for example 1.25 rad/s, the MPPT algorithm logic 410 detects the new rotational speed at 1.25 rad/s, and performs a lookup in the maximum power curve 310 to determine that the target electrical power $P^*_{dc}$ on the combined DC output should be 3 MW for $\omega_m$ of 1.25 rad/s, as shown by point B in FIG. 3c. The power controller 420 then generates an error signal that is processed by the PI controller 411, leading to non-zero error signals in the current controller 430, which further modifies the target d-axis voltage $V^*_{rd}$ 415 and target q-axis voltage $V^*_{rq}$ 417 to increase the combined DC output power to 3 MW (the power value corresponding to point B). In other words, as the turbine is accelerated by the wind, the target electrical power is passed to the power controller 420 and the power controller 420 initiates an adjustment of the electrical power on the combined DC bus by first identifying a target active rectifier d-axis current corresponding to the target electrical power. Next the target active rectifier d-axis current is passed to the current controller 430, which then determines the target active rectifier voltages. The process above continues/iterates and the turbine is further accelerated until the electrical generator rotational speed settles at point 326 (representing an intersection of the maximum power curve 310 and the power curve 320 for a current increased wind speed of 9 m/s) with a generator rotational speed of 1.4 rad/s and a power output of about 4 MW. At this point, the maximum power equals to the mechanical power. All error signals in the power controller 420 and current controller 430 returns to zero and the system enters a new steady state. As such, the example logic flow 400 tracks the maximum power curve 310 of FIG. 3c upward when wind speed increases until the electric power balances the maximum mechanical power at the new wind speed. Similarly, if the wind speed decreases, for example, from 9 m/s to 6.6 m/s, similar MPPT control logic flow applies, but this time, to detect deceleration of the turbine and the electrical generator rotation, and to decreases the active rectifier d-axis current to cause the electrical power on the combined DC bus to decrease to balance the new maximum mechanical power.

Returning to FIG. 1, the integrated rectifier-generator AC-DC conversion system 100 may be further adapted for ripple reduction in the combined DC output 152. Such ripple reduction may be achieved either passively within the passive rectifiers, between passive rectifier using specific AC-port phase shifting inside the generator, or actively by controlling the active rectifier to perform ripple compensation using the main controller 130.

For example, the N passive rectifiers 122, 124, and 126 of FIG. 1 may each be connected to a three-phase AC port (141, 143, and 145) of the electrical generator 144. The three-phases in each of the AC ports may be separated by $$\frac{2\pi}{3}.$$

Figure 5A:
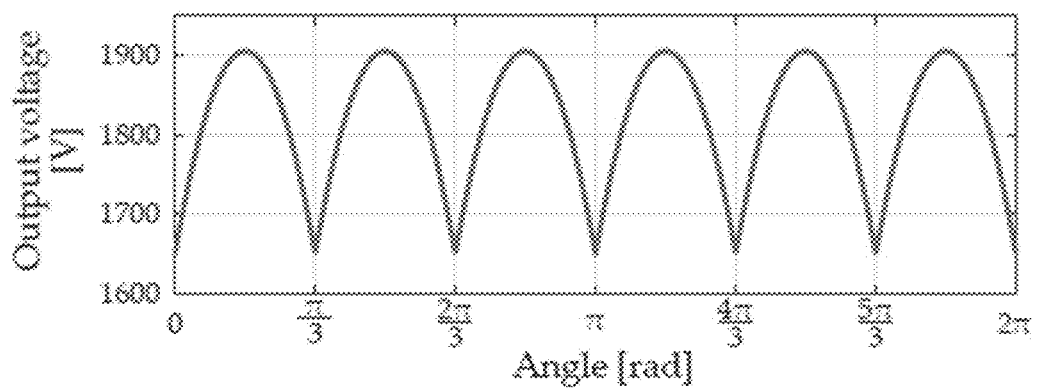
FIGS. 5a and 5b illustrate example passive ripple reduction.
Figure 5B:
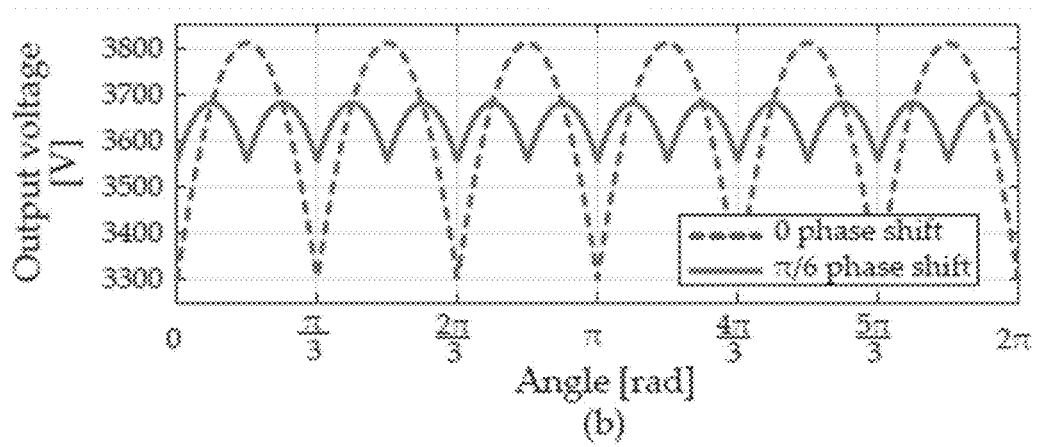

The passive DC output voltage ripple of each of the passive rectifiers (122, 124, and 126) has a peak every $$\frac{\pi}{3}$$

radiants, as shown in FIG. 5a, as a result of three-phase averaging within each passive rectifier, such as the passive rectifier shown in FIG. 2b. Applying an appropriate phase shift between the AC ports leads to further reduction of peak-to-peak ripples of the combined DC output 152 when the passive rectifiers connected to the multiple AC ports of the electrical generator are serially stacked. For example, each AC phase component of each AC port of the generator may be configured to have a preset phase shift against its corresponding AC phase component of another AC port. For example, AC phase component 1 (or 2, or 3) of AC port 141 may have a preset phase shift against AC component 1 (or 2, or 3) of AC port 143, and AC component 1 (or 2, or 3) of AC port 145 may have a preset phase shift against AC component 1 (or 2, or 3) of AC port 143, so on and so forth. The relative phases between the multiple AC ports may be spread over the $$\frac{\pi}{3}$$

radiants. The value of the phase shift between the AC ports may be determined by the number of passive rectifiers in the rectifier assembly. In general, the phase shift spacing between the multiple AC ports may be set to $$\left(\frac{\pi}{3N}\right)$$

radian. As an example, the relative peak-to-peak ripple for two serially stacked passive rectifiers with $$\frac{\pi}{6}$$

phase shifting may be reduced to as low as 3%, compare to 14% without phase shifting between the AC ports, as shown in FIG. 5b.

In an electrical generator, such as a PMSG designed for off shore wind, may be adapted to provide multiple three-phase AC ports with relative phase shift between the multiple AC ports. The relative phase shift in terminal voltages in the PMSG may be achieved in several ways. For example, the generator windings can be spatially distributed along the circumference of the generator stator.

Such passive ripple reduction may be further combined with the main controller with circuitry to perform the power tracking logic flow 400 of FIG. 4 above. Such ripple reduction produces cleaner passive DC output $V_p$ 137 in FIG. 1, and thus alleviates the regulation and control burden on the main controller 130 and the active rectifier 128 to track the maximum harvestable mechanical power.

Figure 6:
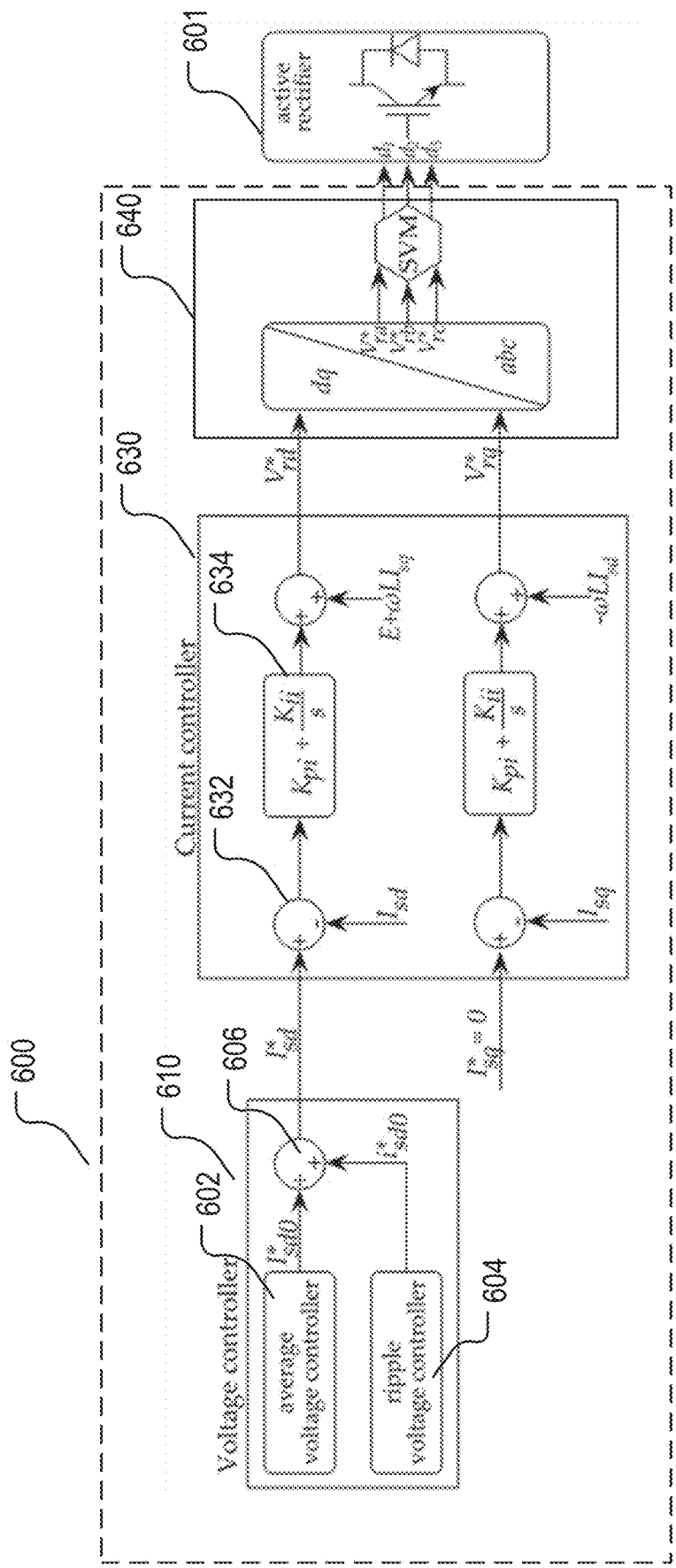
FIG. 6 illustrates an example logic for controlling an output voltage of an active rectifier in the example integrated rectifier-generator AC-DC conversion system of FIG. 1 for active ripple compensation.

Moving on to active ripple compensation and reduction by controlling the active rectifier 128, FIG. 6 illustrates an example logic flow 600 that may be implemented by the main controller 130 for such active ripple compensation. Similar to the MPPT logic flow 400 in FIG. 4, the example logic flow 600 includes a current controller 630 and a control signal generator 640. However, instead of the MPPT algorithm logic 410 and power controller logic 420 of FIG. 4, the example logic flow 600 includes a voltage controller 610. As such, the example logic flow 600 may be adapted for voltage regulation of the combined DC output of the serially stacked passive and active rectifiers.

As shown in FIG. 6, the voltage controller generates a rippled target d-axis current by monitoring the voltage ripple in the serially stacked passive rectifiers, as will be described below in more detail in relation to FIG. 7. The current controller 630 is similar to the current controller of 430 of FIG. 4. Like the current controller 430, the current controller 630 includes two control paths for controlling the d-axis and q-axis voltages of the active rectifier. In particular, the target d-axis current generated by the voltage controller 610 is used by the current controller 630 to generate an error signal between such target d-axis current and the actual d-axis current of the active rectifier, as shown by the comparator 632. Such error signal is processed by a PI controller 634 for generating the target d-axis voltage for the active rectifier with opposite ripples that can compensate the ripples from the serially stacked passive rectifiers.

The voltage controller 610 may include an average voltage controller 602 in addition to a ripple voltage controller 604, with their output denoted by $I^*_{sd0}$ and $i^*_{sd0}$, respectively. These two outputs are combined at adder 606. The average voltage controller 602 may be configured to monitor the average drift of the DC output of the stacked passive rectifiers to form part of the target d-axis target current for the active rectifier such that the average voltage drift of the passive rectifiers may be compensated by controlling the output voltage of the active passive rectifier. The ripple voltage controller may be configured to monitor the voltage ripple of the serially stacked passive rectifiers for ripple compensation, as described above.

Figure 7:
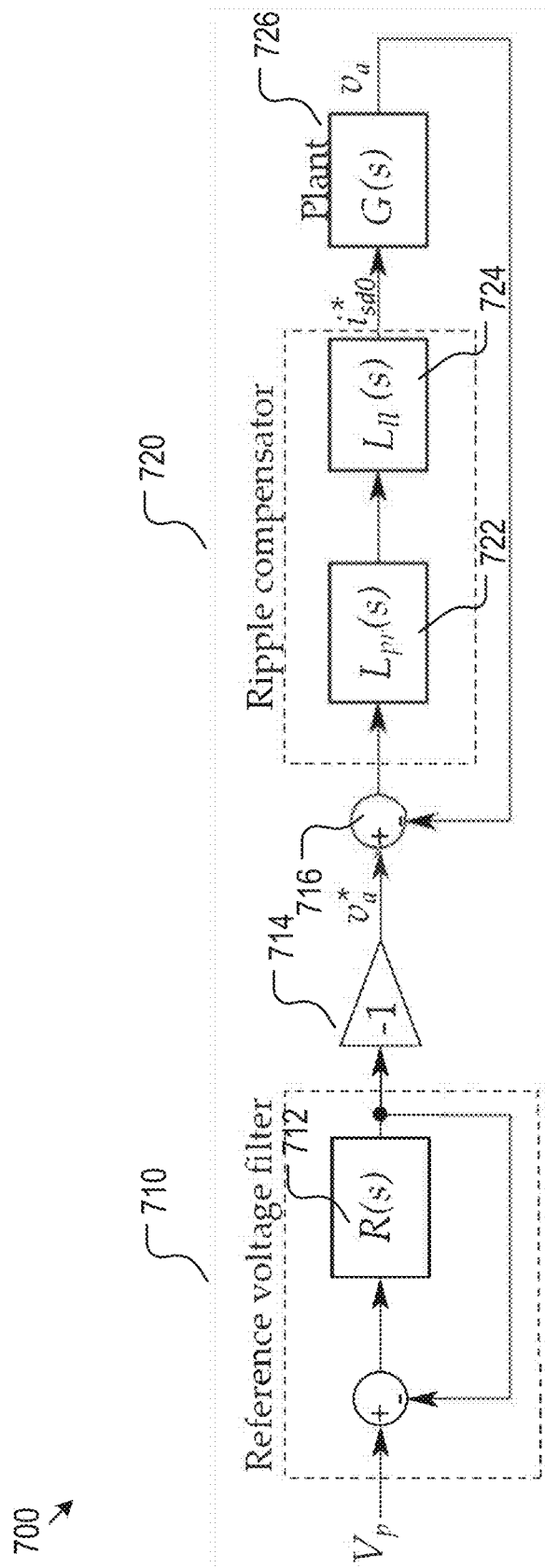
FIG. 7 illustrates an example ripple voltage controller for active ripple compensation.

FIG. 7 illustrate an example implementation 700 of the ripple voltage controller 604 of FIG. 6. The ripple voltage controller implementation 700, for example, may include a ripple compensator 720 and a reference voltage filter 710. The reference voltage filter 710 may be configured to filter an input signal indicative of the DC output voltage $V_p$ of the serially-stacked passive rectifiers to only retain a ripple component at a target compensation frequency, with a transfer function R(s) (denoted by 712 in FIG. 7):

$$R(s) = \frac{2K_i^{pr} w_c^{pr} s}{s^2 + 2w_c^{pr} s + (\omega^{pr})^2}$$

where $K_i^{pr}$, $\omega_c^{pr}$, and $\omega_{pr}$ are various filter design parameters. In some implementations, the R(s) function may be set to:

$$R(s) = \frac{2400\, \pi s}{s^2 + 120\pi s + 0.25}.$$

This represents the passive rectifier ripple that need to be compensated at the active rectifier DC output. The ripple component is then reversed in polarity for compensation purposes, as shown by 714. The ripple voltage controller thus obtains a reference signal $v^*_a$, which is set to the negative of the passive voltage ripple. As shown by 716, an error signal is then generated, by comparing reference $v^*_a$ signal with its feedback counterpart signal measured after the plant transfer function G(s) 726:

$$G(s) = -\frac{3I_{sd0}L}{2I_{load}} \frac{\left(s - \frac{E - 2I_{sd0}R}{I_{sd0}L}\right)}{(\tau s + 1)\left(\frac{CV_{a0}}{I_{load}}s + 1\right)}.$$

where: $I_{sd0}$ is the active rectifier nominal d-axis current, L is the generator per-phase synchronous inductance, E is the generator line-to-neutral peak back emf, R is the generator per-phase resistance, $I_{load}$ is the combined DC bus current, $V_{a0}$ is the active rectifier DC output voltage corresponding to the $I_{sd0}$ input, C is the active rectifier capacitance, and τ is a design parameter.

The ripple voltage controller 700 then passes the error signal to the ripple compensator 720. The ripple compensator 720 may include a proportional-resonant (PR) controller 722 cascaded with a lead-lag (LL) controller 724. The PR controller 722 allows the voltage ripple to be tracked with zero-phase delay and the lead-lag controller 724 is used to adjust the open-loop phase margin. The output of the ripple compensator 720 functions as the target d-axis ripple current for the active rectifier, denoted by $i^*_{sd0}$, shown as the output of the ripple voltage controller 604 of FIG. 6. The output $i^*_{sd0}$, is further provided to the plant transfer function G(s) 726 and functions as the $I_{sd0}$ in the G(s) function described above.

Figure 8A:
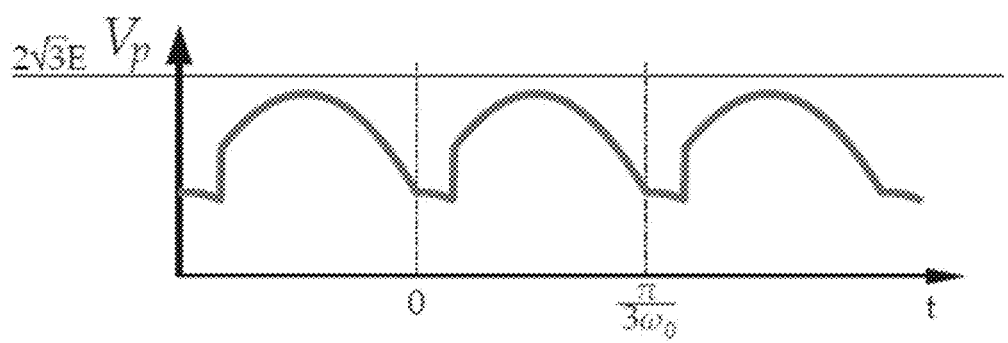
FIGS. 8a and 8b illustrate active ripple voltage compensation.
Figure 8B:
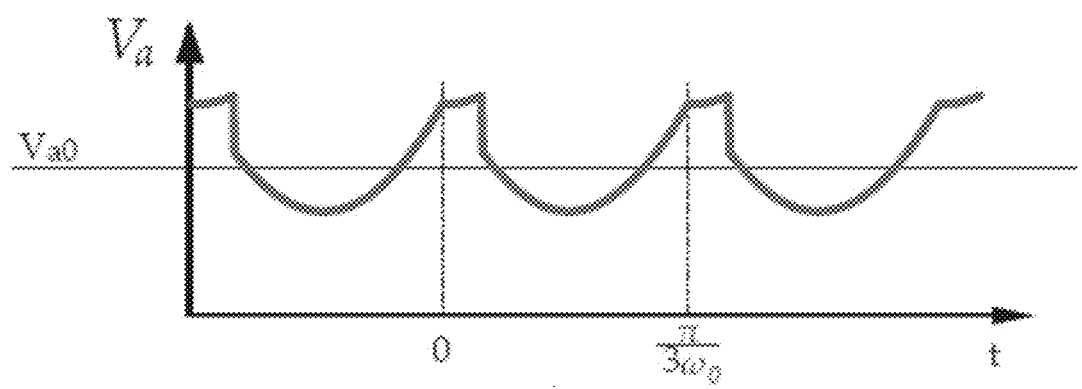

FIGS. 8a and 8b further illustrate the concept of active ripple voltage compensation achieved by controlling the active rectifier using the example logic flow 600 of FIG. 6. For example, FIG. 8a illustrates a passive rectifier DC output voltage profile. This profile has a ripple component at six-times the electrical fundamental frequency as a result of the three-phase diode bridge operation. Such voltage ripple may be expressed as:

$$V_p(t) = V_{p0} + \sum_{k=1}^{\infty} V_{pk}\cos(6k\omega + \phi_k)$$

where $V_{p0}$ is the average output voltage of the passive rectifier, $\omega$ is the fundamental electrical frequency, $V_{pk}$ and $\phi_k$ are the amplitude and the phase of the sinusoidal ripple component at $6k\omega$ frequency, respectively. FIG. 8b illustrates an active rectifier DC output voltage profile with compensation. The active rectifier generates a voltage ripple opposite to the passive rectifier to achieve an overall ripple compensation on the combined DC output. For example, output of the active rectifier may be expressed as:

$$V_a(t) = V_{a0} - \sum_{k=1}^{N} V_{pk}\cos(6k\omega + \phi_k)$$

where $V_{a0}$ is the average component and N is the highest harmonic order that can be synthesized by the active rectifier. Active compensation at least partially reduces the voltage ripple of the combined DC voltage.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A rectifying circuit, comprising:
   an active rectifier comprising a first AC input, a control input, and a first DC output;
   a passive rectifier comprising a second AC input, and a second DC output serially stacked with the first DC output to form a combined DC output; and
   a main controller configured to measure a voltage ripple in the second DC output and provide one or more control signals to the control input of the active rectifier to regulate an output characteristics of the first DC output by reducing a voltage ripple in the combined DC output using a ripple compensation circuitry when the active rectifier and the passive rectifier are connected to a first AC source and a second AC source via the first AC input and the second AC input, respectively.

2. The rectifying circuit of claim 1, wherein the ripple compensation circuit is configured to provide the one or more control signals to the control input of the active rectifier to generate a voltage ripple in the first DC output having identical amplitude and opposite phase of the measured voltage ripple in the second DC output.

3. The rectifying circuit of claim 1, wherein:
   the first AC input of the active rectifier comprises a plurality of AC components of different relevant phases; and
   the control input of the active rectifier comprises a plurality of control ports corresponding to the plurality of AC components for regulating a superposition of the plurality of AC components to form the first DC output.

4. The rectifying circuit of claim 3, wherein:
   the active rectifier further comprises a plurality of power switches between the plurality of AC components and the first DC output; and
   the one or more control signals from the main controller comprises a plurality of control signals for controlling each of the plurality of power switches to connect a corresponding AC component of the plurality of AC components to the first DC output or disconnecting the corresponding AC component from the first DC output for regulating the superposition of the plurality of AC components to form the first DC output.

5. The rectifying circuit of claim 1, wherein the ripple compensation circuit is configured to generate control signals for the active rectifier to modulate the first DC output in voltage such that the first DC output compensates the voltage ripple in the second DC output and thus reduce the voltage ripple in the combined DC output.

6. The rectifying circuit of claim 5, wherein the ripple compensation circuit comprises:
a reference voltage filter to derive a reference ripple voltage in accordance with a voltage of the second DC output; and
a ripple compensator to derive a perturbation d-axis current in accordance with the reference ripple voltage and a feedback ripple voltage, the ripple compensator further providing the control signals to the active rectifier to control the first DC output in voltage.

7. The rectifying circuit of claim 5, wherein the ripple compensation circuit comprises:
a voltage controller configured to monitor a current voltage ripple in the second DC output to derive a target ripple compensating current value for the active rectifier;
a current controller configured to derive a target ripple compensating voltage value for the active rectifier based on the target ripple compensating current value and a currently monitored current of the active rectifier; and
a control signal generator configured to convert the target ripple compensating voltage value into the one or more control signals.

8. The rectifying circuit of claim 1, further comprising an additional passive rectifier comprising a third AC input and a third DC output serially stacked with the first DC output and the second DC output to form the combined DC output.

9. The rectifying circuit of claim 8, wherein:
the second AC input comprises a first plurality of AC components having different relative phases;
the third AC input comprises a second plurality of AC components having different relative phases; and
the first plurality of AC components and the second plurality of AC components have different relative phases.

10. The rectifying circuit of claim 1, wherein:
the first AC input and the second AC input are provided from an electrical generator driven by an energy harvester; and
the main controller comprises a maximum power tracking circuit configured to control a power flow in the active rectifier to track maximum power extraction by the energy harvester.

11. The rectifying circuit of claim 10, wherein the maximum power tracking circuit is configured to control the power flow of the active rectifier to derive a maximum power which could be harvested from the energy harvester by tracking an optimal rotational speed of the electrical generator based on a predetermined maximum power point tracking algorithm.

12. The rectifying circuit of claim 11, wherein the energy harvester comprises a wind turbine.

13. A rectifying circuit, comprising:
an active rectifier comprising a first AC input, a control input, and a first DC output;
a passive rectifier comprising a second AC input, and a second DC output serially stacked with the first DC output to form a combined DC output; and
a main controller configured to provide one or more control signals to the control input of the active rectifier to regulate an output characteristics of the first DC output when the active rectifier and the passive rectifier are connected to a first AC source and a second AC source via the first AC input and the second AC input, respectively,
wherein:
the first AC input and the second AC input are provided from an electrical generator driven by an energy harvester;
the main controller comprises a maximum power tracking circuit configured to control a power flow in the active rectifier to track maximum power extraction by the energy harvester; and
the maximum power tracking circuit comprises:
a power controller configured to monitor a current rotational speed of the electrical generator and to derive a target current value for the active rectifier based on the predetermined maximum power point tracking algorithm;
a current controller configured to derive a target voltage value for the active rectifier based on the target current value and a currently monitored current of the active rectifier; and
a control signal generator configured to convert the target voltage value into the one or more control signals.

14. The rectifying circuit of claim 13, wherein:
the power controller comprises a first proportional integral controller with a first set of pre-tuned proportional and integral gains; and
the current controller comprising a second proportional integral controller with a second set of pre-tuned proportional and integral gains.

15. An integrated rectifier-generator AC-DC conversion system, comprising:
a rectifying circuit, comprising:
an active rectifier comprising a first AC input, a control input, and a first DC output;
a passive rectifier comprising a second AC input, and a second DC output serially stacked with the first DC output to form a combined DC output; and
a main controller configured to measure a voltage ripple in the second DC output and provide one or more control signals to the control input of the active rectifier to regulate an output characteristics of the first DC output by reducing a voltage ripple in the combined DC output using a ripple compensation circuitry when the active rectifier and the passive rectifier is connected to a first AC source and a second AC source via the first AC input and the second AC input, respectively; and
an AC electrical generator comprising a first AC output and a second AC output connected to the first AC input of the active rectifier and the second AC input of the passive rectifier, respectively.

16. The integrated rectifier-generator AC-DC conversion system of claim 15, wherein the AC electric generator comprises a multi-port permanent-magnet synchronous generator.

17. The integrated rectifier-generator AC-DC conversion system of claim 15, wherein:

the first AC input and the second AC input are provided from an electrical generator driven by an energy harvester; and the main controller comprises a maximum power tracking circuit configured to control a power flow in the active rectifier to track maximum power extraction by the energy harvester.

18. The integrated rectifier-generator AC-DC conversion system of claim 17, wherein maximum power tracking circuit is configured to control the power flow of the active rectifier to derive a maximum power which could be harvested from the energy harvester by tracking an optimal rotational speed of the electrical generator based on a predetermined maximum power point tracking algorithm.

* * * * *